United States Patent [19]

Abdul-Raheem

[11] Patent Number: 5,603,181
[45] Date of Patent: Feb. 18, 1997

[54] DEVICE FOR CONNECTED A FISHING LINE TO FISHING ACCESSORIES

[75] Inventor: Qaiyim Abdul-Raheem, Newalla, Okla.

[73] Assignee: H.A.L.A.Q., Inc., Newalla, Okla.

[21] Appl. No.: 438,462

[22] Filed: May 10, 1995

Related U.S. Application Data

[63] Continuation-in-part of Ser. No. 229,259, Apr. 18, 1994, abandoned.

[51] Int. Cl.⁶ .......................... A01K 91/03; A01K 91/04
[52] U.S. Cl. .................. 43/44.92; 43/42.49; 43/44.83; 24/131 R; 289/1.5
[58] Field of Search ................ 43/44.83, 42.49, 43/44.94, 44.95, 44.89, 44.92; 114/230, 231; 24/131 R, 115 K; 289/1.5

[56] References Cited

U.S. PATENT DOCUMENTS

| 516,185 | 3/1894 | Carver | 24/131 R |
|---|---|---|---|
| 2,216,487 | 10/1940 | Domagala | 24/131 |
| 3,785,011 | 1/1974 | Marks | 24/115 |
| 4,905,403 | 3/1990 | Manno | 43/43.16 |
| 5,009,025 | 4/1991 | Austad | 43/44.83 |
| 5,181,337 | 1/1993 | DuBois | 43/44.83 |

*Primary Examiner*—Jeanne M. Elpel
*Attorney, Agent, or Firm*—Dunlap & Codding, P.C.

[57] ABSTRACT

A connecting device for connecting an object, such as a fishing lure, to a line without formation of a knot in the line. The connecting device includes a first shank angularly disposed from a second shank, a line engaging hook and a line retaining loop.

9 Claims, 3 Drawing Sheets

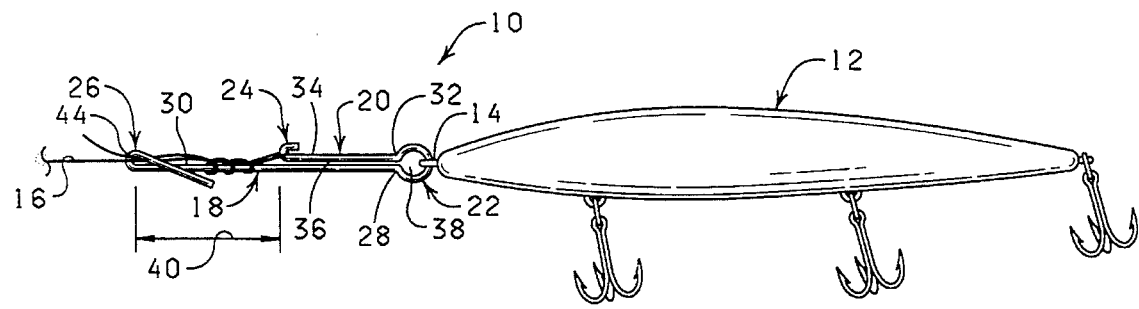
FIG. 1
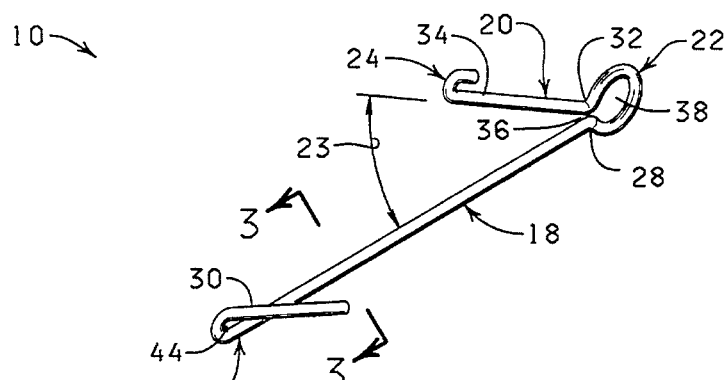
FIG. 2
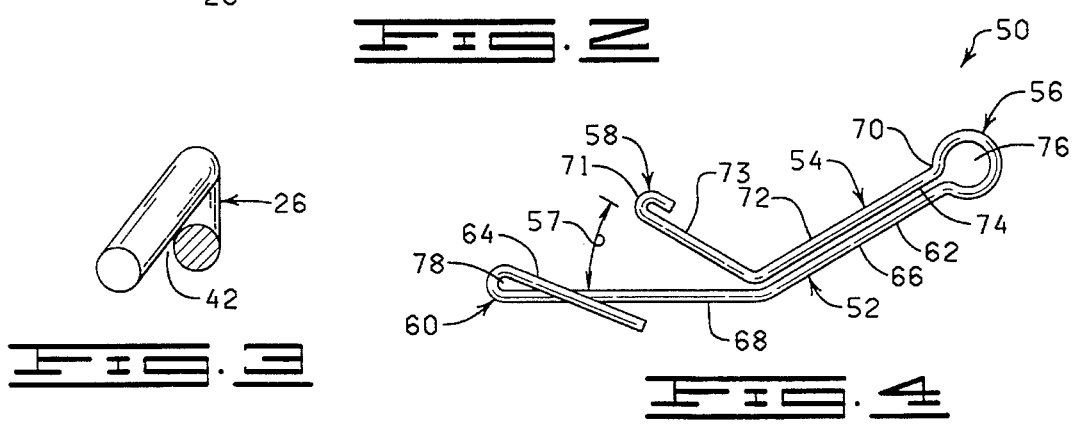
FIG. 3
FIG. 4
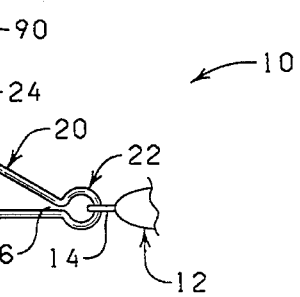
FIG. 5

5,603,181

DEVICE FOR CONNECTED A FISHING LINE TO FISHING ACCESSORIES

CROSS REFERENCE TO RELATED APPLICATION

This is a continuation-in-part of application, DEVICE FOR CONNECTING A FISHING LINE TO FISHING ACCESSORIES, U.S. Ser. No. 08/229,259, filed Apr. 18, 1994, now abandoned.

FIELD OF THE INVENTION

The present invention relates generally to connecting devices for securing a line to an object, and more particularly but not by way of limitation, to a connecting device for connecting a fishing line to a fishing accessory without requiring formation of a knot in the fishing line.

BRIEF DESCRIPTION OF THE DRAWINGS

FIG. 1 is an elevational view illustrating the connection of a fishing line to a fishing lure employing a connecting device constructed in accordance with the present invention.

FIG. 2 is a perspective view of the connecting device of the present invention.

FIG. 3 is a cross-sectional view of the connecting device of FIG. 2 taken along 3—3.

FIG. 4 is an elevational view of another embodiment of a connecting device constructed in accordance with the present invention.

FIGS. 5–8 are elevational views of a fishing line and the connecting device of FIG. 1 illustrating the procedure for connecting the fishing line to the connecting device.

DESCRIPTION OF PREFERRED EMBODIMENTS

Figure 6:
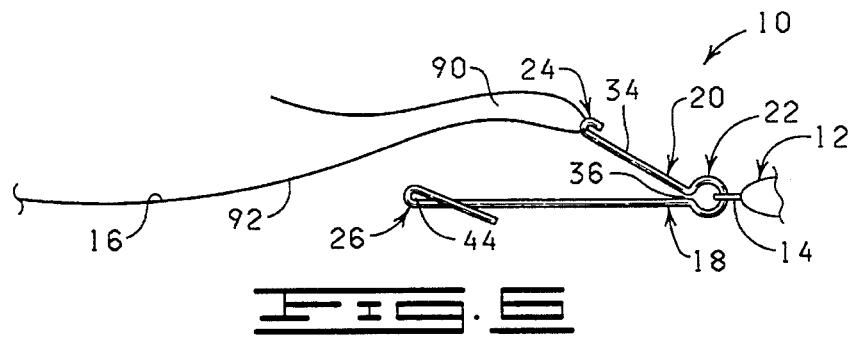

Fishermen frequently change baits in order to determine a bait that will attract fish. It is customary for such fishermen to tie a knot in the fishing line in order to secure the bait to the fishing line. However, the tying of knots in the fishing line is difficult for young children, physically impaired persons, persons with arthritis or in dark and inclement weather conditions. Thus, it would be desirable if a device could be provided which would permit fishermen to quickly and easily connect a bait to a fishing line without requiring the tying of a knot in the fishing line.

The term "fishing accessory" as used herein is to be understood to mean any object which a fisherman may desire to secure to a fishing line, such as a lure, a hook, a swivel and the like. The only limitation as to such accessories is that the accessories be equipped with a connecting eyelet.

Referring now to the drawings, and more particularly to FIG. 1, a connecting device 10 constructed in accordance with the present invention is shown connecting a lure 12 having a connecting eyelet 14 to a fishing line 16. As will be more fully described hereinafter, the connecting device 10 permits fishermen to connect the lure 12 to the fishing line 16 without requiring a knot to be formed in the fishing line 16.

Referring now to FIGS. 1–3, the connecting device 10 is provided with a first shank 18, a second shank 20, an eyelet member 22, a line engaging hook 24 and a line retaining loop 26. The first shank 18 is characterized as having a first end 28 and a second end 30; and the second shank 20 is also characterized as having a first end 32 and a second end 34. The first ends 28, 32 of the first and second shanks 18, 20 are connected to the eyelet member 22 so that the first and second shanks 18, 20 extend from the eyelet member 22 in a substantially biased, angularly offset relationship (shown in FIG. 2 as angle 23) and define a passageway 36 therebetween which openly communicates with a cavity 38 of the eyelet member 22.

The first shank 18 is angularly offset at the angle 23 from the second shank 20 in order to impart a springlike resistance to the first shank 18 and the second shank 20. As will be explained below, the springlike resistance imparted to the first and second shanks 18 and 20 assists in securing the fishing line 16 to the device 10, and further assists in releasing the fishing line 16 from the device 10. The angle 23 is any angle sufficient to impart the springlike resistance to the first and second shanks 18 and 20.

The second end 34 of the second shank 20 terminates a distance 40 from the second end 36 of the first shank 18. The distance 40 between the second ends 30, 34 of the first and second shanks 18, 20 can vary widely provided the distance 40 is sufficient to permit the fishing line 16 to be wrapped about the first shank 18 when the fishing line 16 is connected to the device 10 substantially as shown in FIG. 1.

The line engaging hook 24 is provided with a substantially C-shaped configuration and is connected to the second end 34 of the second shank 20 so as to extend therefrom in a direction away from the first shank 18 substantially as shown; and the line retaining loop 26 is connected to the second end 30 of the first shank 18. The line retaining loop 26 defines a line receiving passageway 42 (FIG. 3) which openly communicates with a line receiving cavity 44 of the line retaining loop 26. Thus, the line engaging hook 24 cooperates with the first shank 18 and the line retaining loop 26 to secure the fishing line 16 to a fishing accessory, such as lure 12.

The length of the first and second shanks 18, 20 of the connecting device 10 can vary widely provided that the length of the first shank 18 is sufficiently longer than the length of the second shank 20 so as to permit the fishing line to be wrapped about a portion of the first shank when connecting the fishing line to the connecting device 10. However, for fresh water fishing, desirable results can be obtained when the first shank 18 is provided with a length of from about 0.4 to about 800 mm and the second shank 20 is provided with a length of from about 0.2 to about 400 mm.

Referring now to FIG. 4, a connecting device 50 constructed in accordance with the present invention is illustrated. The connecting device 50 is provided with a first shank 52, a second shank 54, an eyelet member 56, a line engaging hook 58 and a line retaining loop 60. The first shank 52 is provided with a first end 62, a second end 64 and first and second medial portions 66, 68 disposed therebetween. The second medial portion 68 of the first shank member 52 extends from the first medial portion 66 so that an obtuse angle is formed therebetween.

The second shank 54 has a first end 70, a second end 71, and first and second medial portions 72 and 73. The second medial portion 73 extends from the first medial portion 72 so that an obtuse angle is formed therebetween. The first ends 62, 70 of the first and second shanks 52, 54 are connected to the eyelet member 56 so that the first medial portion 66 of the first shank 52 and the first medial portion 72 of the second shank 54 extend from the eyelet member 56 in a substantially parallel relationship and define a passageway 74 therebetween which openly communicates with a cavity 76 of the eyelet member 56. The second medial portion 68 of the first shank 52 is angularly offset at the angle 57 from the second medial portion 73 of the second shank 54 in order to impart a springlike resistance to the first shank 52 and the second shank 54. The angle 57 is any angle sufficient to impart the springlike resistance to the first and second shanks 52 and 54.

The line engaging hook 58 is provided with a substantially C-shaped configuration and is connected to the second end 71 of the second shank 54 so as to extend therefrom in a direction away from the first and second medial portions 66, 68 of the first shank 52 substantially as shown; and the line retaining loop 60 is connected to the second end 64 of the first shank 52. The line retaining loop 60 is identical in construction and function as the line retaining loop 26 of the connecting device 10 heretofore described with reference to FIGS. 1–3. That is, the line retaining loop 60 defines a line receiving passageway (not shown) which openly communicates with a line receiving cavity 78 of the line retaining loop 60. Thus, the line engaging hook 58 cooperates with the second medial portion 68 of the first shank 52 and the line retaining loop 60 to secure the fishing line to a fishing accessory.

The connecting devices 10 and 50 are desirably of unitary construction and are fabricated of a material having sufficient strength so as to maintain the configuration and integrity of the connecting devices 10 and 50 under normal conditions encountered by fishermen using such devices to connect a fishing line to a fishing accessory. Additionally, the material must be capable of exhibiting springlike resistance when the devices 10 and 50 are constructed as previously described. Examples of material which can be employed in the fabrication of the connecting devices 10 and 50 are steel and plastic wire.

The size of the material employed in the fabrication of the connecting devices 10 and 50 can also vary widely and will generally be dependent upon the species of fish being sought and the weight of the fishing line. However, for most fresh water fishing desirable results can be obtained wherein the material has a gauge thickness of from about 0.01 to about 1 cm.

The procedure for connecting a fishing accessory to a fishing line employing the connecting device 10 is substantially identical to the procedure for connecting a fishing accessory to a fishing line using the connecting device 50. Thus, only the connection of a fishing accessory, such as the lure 12, to the fishing line 16 employing the connecting device 10 will be described.

When employing the connecting device 10 to connect the lure 12 to the fishing line 16, the fishing lure 12 is initially connected to the connecting device 10 by positioning the line engaging hook 24 of the connecting device 10 through the connecting eyelet 14 of the lure 12 and sliding the connecting eyelet 14 of the lure 12 through the passageway 36 defined between the first and second shanks 18, 20 of the connecting device 10 until the connecting eyelet 14 of the lure 12 connectingly engages the eyelet member 22 of the connecting device 10. Once the lure 12 has been connected to the connecting device 10, the fishing line 16 is then connected to the connecting device 10 through a sequence of steps illustrated in FIGS. 5–8.

Figure 7:
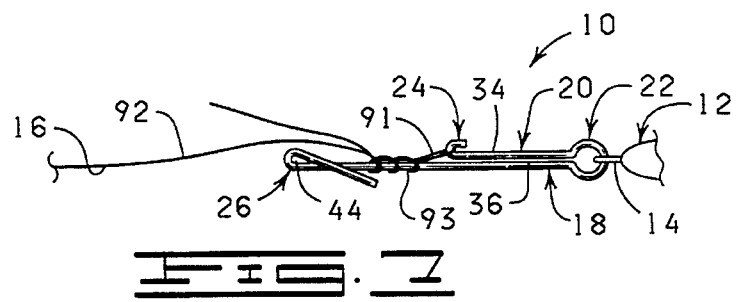

To connect the fishing line 16 to the connecting device 10, a loop 90 is formed in a distal end portion 92 of the fishing line 16 (FIG. 5). The loop 90 is then positioned over the line engaging hook 24 formed on the second end 34 of the second shank 20 (FIG. 6). The fishing line 16 and the adjacently disposed distal end portion 92 thereof, which cooperate to form the loop 90, are then wrapped around the first shank 18 of the connecting device 10 so as to provide a plurality of turns 93 of the fishing line 16 on the first shank 18 of the connecting device 10 (FIG. 7). The number of the turns 93 of the fishing line 16 on the first shank 18 can vary but will desirably be at least two, and more desirably from about 4 to about 7.

Figure 8:
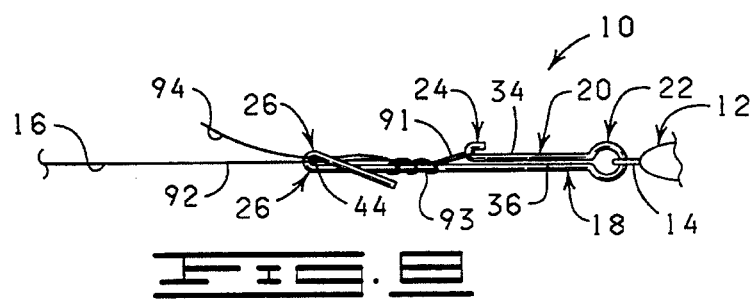

When the first of the turns 93 is wrapped around the first shank 18 of the connecting device 10, the distal end portion 92 of line 16 is pulled taut, thereby drawing the second shank 20 toward the first shank 18 until the first shank 18 and the second shank 20 are disposed in a substantially parallel position, as shown in FIGS. 7 and 8. When the first and second shanks 18 and 20 are spatially disposed in the substantially parallel position, the springlike resistance of the first and second shanks 18 and 20 acts to maintain a portion 91 of the distal end portion 92 of the line 16 in a tensioned state. The tensioned state of the portion 91 of the line 16 assists in maintaining the attachment of the line 16 to the device 10 when the line 16 and the device 10 are subject to perturbation, as when the line 16 and the device 10 are pulled through air or water, or when the line 16 and device 10 are subjected to shocks and twisting movement caused by a fish striking the lure 12, or being hooked thereby.

After the fishing line 16 and the adjacently disposed distal end portion 92 of the fishing line 16 have been wrapped around the first shank 18 of the connecting device 10, the fishing line 16 and the distal end portion 92 are drawn or caused to pass through the line retaining loop 26 via the line receiving passageway 42 (FIG. 3) and the line receiving cavity 44 of the line retaining loop 26 (FIG. 8) and thereby connect the fishing line 16 to the lure 12 without requiring the formation of a knot in the fishing line 16. If desired, a pigtail 94 formed by the remainder of the distal end portion 92 of the fishing line 16 can be cut off in a customary manner.

When the line 16 is released from the device 10, the turns 93 are unwrapped from the first shank 18, thereby releasing tension from the portion 91 of the distal end portion 92 of the line 16. The release of tension on the portion 91 of the line 16 allows the springlike resistance of the first and second shanks 18 and 20 to return the second shank 20 to a substantially angularly offset position (approximately equivalent to angle 23, shown in FIG. 5), thereby assisting in the release of the loop 90 of the line 16 from the line engaging hook 24 formed on the second end 34 of the second shank 20.

Figure 9:
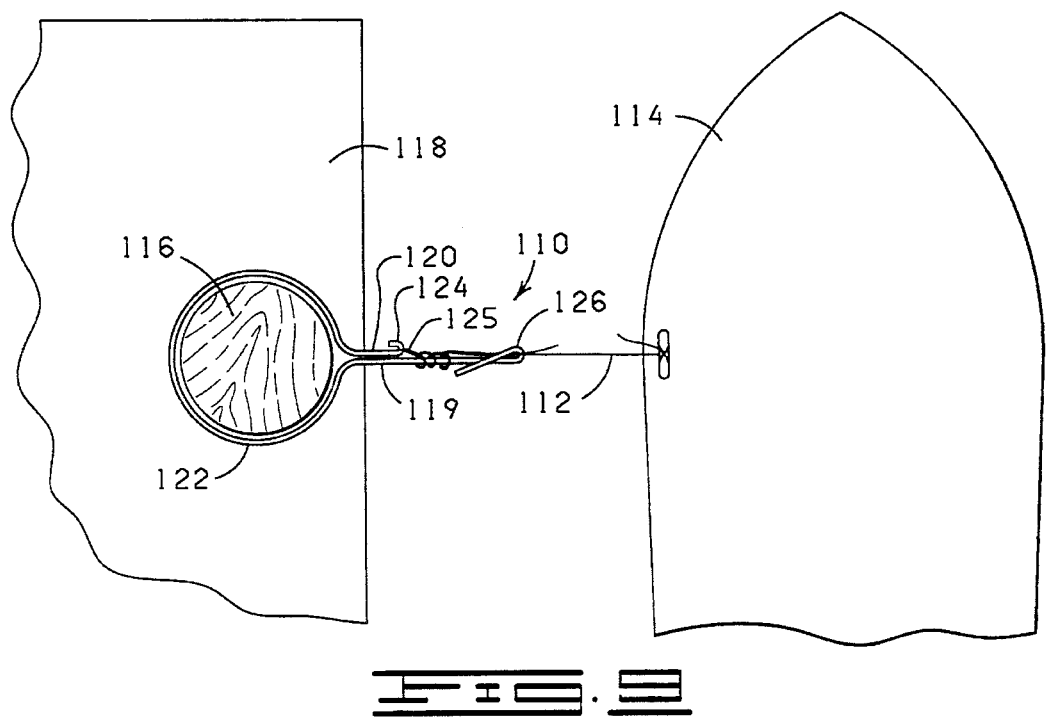
FIG. 9 is a top plan view of the connecting device of FIG. 1 wherein such connecting device is employed to secure a boat to a dock via a rope.

Referring now to FIG. 9, a connecting device 110 of the present invention is illustrated for connecting a mooring or docking line 112 of a boat 114 to a mooring post 116 of a dock 118. The connecting device 110 is substantially identical in construction as the connecting device 10 except that the connecting device 110 is constructed of heavier materials. That is, the connecting device 110 is provided with a first shank 119, a second shank 120, angularly disposed from the first shank 119, an eyelet member 122, a line engaging hook 124 and a line retaining loop 126. The eyelet member 122 is sized so as to be positionable over an object to which the boat 114 is to be tied, such as the mooring post 116. Since the connecting device 110 is substantially identical in construction as the connecting device 10, and the docking line 112 is connected to the connecting device 110 in the same manner as the fishing line 16 is connected to the connecting device 10, no further description of the connecting device 110 or its use in the securing of the boat 114 to the mooring post 116 of the dock 118 via the mooring line 112 is believed necessary to enable one skilled in the art to construct and use the connecting device 110.

Figure 10:
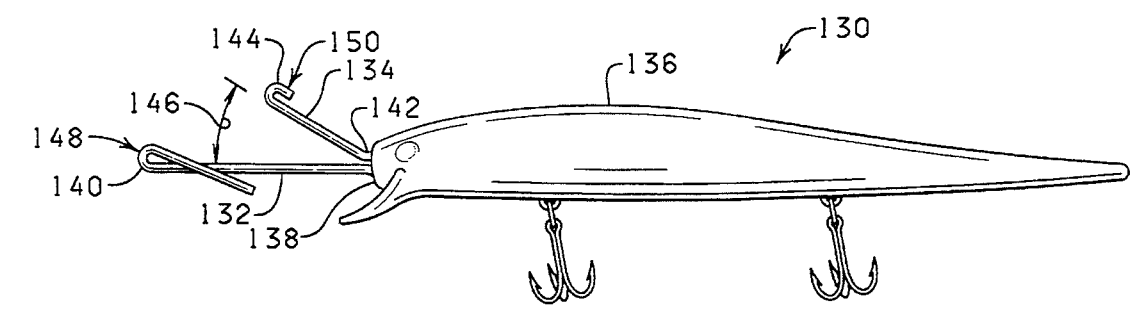
FIG. 10 is an elevational view of the connecting device of the present invention incorporated into a fishing lure.

Shown in FIG. 10 is a connecting device 130 constructed in accordance with the present invention and integrally formed with a fishing lure. The connecting device 130 is provided with a first shank 132, a second shank 134 and a fishing lure body 136. The first shank 132 has a first end 138 and a second end 140, the second end 140 being formed into a line retaining loop 148. The second shank 134 has a first end 142 and a second end 144, the second end 144 being formed into a line engaging hook 150.

The first end 138 of the first shank 132 and the first end 142 of the second shank 134 are connected to the fishing lure body 136 so that the first and second shanks 132 and 134 extend from the fishing lure body 136 in a substantially biased, angularly offset relationship (angle 146). The angle 146 is any angle sufficient to impart springlike resistance to the first and second shanks 132 and 134. Except as described above, the connecting device 130 is constructed and used in exactly the same manner as the connecting device 10 shown in FIGS. 1, 2 and 5–8.

The first end 138 of the first shank 132 and the first end 142 of the second shank 134 may be segmented (not shown) and affixed within the fishing lure body 136. Alternately, the first end 138 of the first shank 132 and the first end 142 of the second shank 134 can be connected to an eyelet (not shown) which, in turn, can be affixed within the fishing lure body 136.

Figure 11:
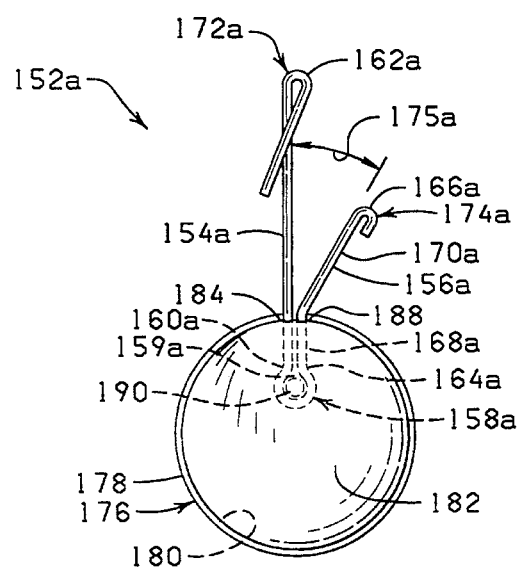
FIG. 11 is an elevational view of another embodiment of a connecting device constructed in accordance with the present invention, having a fishing float connected to one end thereof.

FIG. 11 shows a connecting device 152a constructed in accordance with the present invention. The connecting device 152a is provided with a first shank 154a, a second shank 156a and an eyelet member 158a. The eyelet member 158a defines a receiving cavity 159a.

The first shank 154a has a first end 160a and a second end 162a, the second end 162a being formed into a line retaining loop 172a. The second shank 156a has a first end 164a, a second end 166a, and first and second medial portions 168a and 170a disposed therebetween. The second end 166a of the second shank 156a is formed into a line engaging hook 174a.

The first end 160a of the first shank 154a and the first end 164a of the second shank 156a are connected to the eyelet member 158a so that a part of the first shank 154a and the first medial portion 168a of the second shank 156a extend from the eyelet member 158a in a substantially parallel relationship. The second medial portion 170a of the second shank 156a extends from the first medial portion 168a so that an obtuse angle is formed therebetween, and so that the second medial portion 170a is substantially biased and angularly offset (angle 175a) from a part of the first shank 154a. The angle 175a is any angle sufficient to impart springlike resistance to the first and second shanks 154a and 156a.

The device 152a is connected to a fishing float or bobber 176. The bobber 176 has an outer peripheral sidewall 178 having an inner surface 180 defining a flotation cavity 182. The bobber 176 is constructed of any suitable material. One example of suitable material is molded styrene plastic. First and second apertures 184, 188 extend through the sidewall 178, allowing communication with the flotation cavity 182 of the bobber 176. A pin 190 is connected to portions of the inner surface 180 of the sidewall 178. The pin 190 at least partially fits within the receiving cavity 159a of the eyelet member 158a of the device 152a.

A part of the first shank 154a of the device 152a extends through the first aperture 184 of the sidewall 178. A part of the first medial portion 168a of the second shank 156a extends through the second aperture 188 of the sidewall 178 of the bobber 176. The first and second apertures 184 and 188 are thereafter sealed to render the flotation cavity 182 substantially watertight. Except as described above, the connecting device 152a is constructed and used in exactly the same manner as the connecting device 10 shown in FIGS. 1 and 2.

Figure 12:
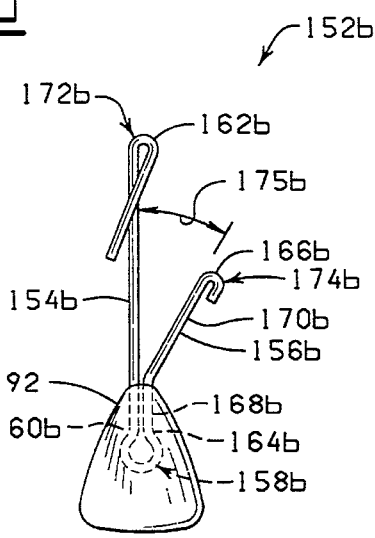
FIG. 12 is an elevational view of the connecting device of FIG. 11 having a fishing weight connected to one end thereof.

FIG. 12 shows a connecting device 152b constructed in accordance with the present invention. The connecting device 152b is generally similar in construction to the connecting device 152a shown in FIG. 11. The connecting device 152b is provided with a first shank 154b, a second shank 156b and an eyelet member 158b. The eyelet member 158b defines a receiving cavity 159b.

The first shank 154b has a first end 160b and a second end 162b, the second end 162b being formed into a line retaining loop 172b. The second shank 156b has a first end 164b, a second end 166b, and first and second medial portions 168b, 170b disposed therebetween. The second end 166b of the second shank 156b is formed into a line engaging hook 174b.

The first end 160b of the first shank 154b and the first end 164b of the second shank 156b are connected to the eyelet member 158b so that a part of the first shank 154b and the first medial portion 168b of the second shank 156b extend from the eyelet member 158b in a substantially parallel relationship. The second medial portion 170b of the second shank 156b extends from the first medial portion 168b so that an obtuse angle is formed therebetween, and so that the second medial portion 170b is substantially biased and angularly offset (angle 175b) from a part of the first shank 154b. The angle 175b is any angle sufficient to impart springlike resistance to the first and second shanks 154b and 156b.

The device 152b is attached to a fishing weight 192. The fishing weight 192 is typically constructed of lead, but any suitable material may be used. The fishing weight 192 is formed or cast about the eyelet member 158b, a part of the first shank 154b and a part of the first medial portion 168b of the second shank 156b of the device 152b. Except as described above, the connecting device 152b is constructed and used in exactly the same manner as the connecting device 10 shown in FIGS. 1 and 2.

Figure 13:
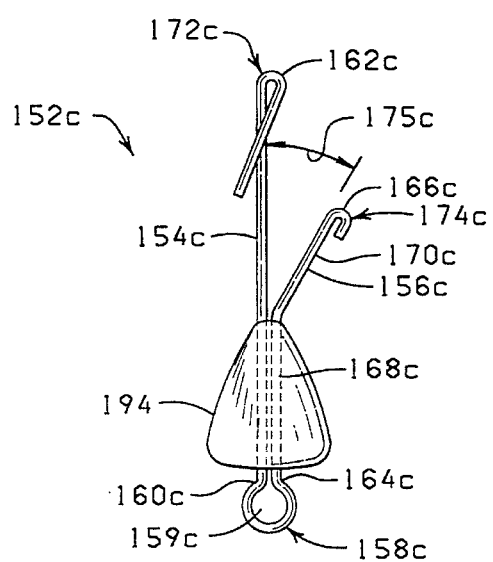
FIG. 13 is an elevational view of another embodiment of a connecting device constructed in accordance with the present invention having a fishing weight disposed thereon.

FIG. 13 shows a connecting device 152c constructed in accordance with the present invention. The connecting device 152c is generally similar in construction to the connecting device 152a shown in FIG. 11. The connecting device 152c is provided with a first shank 154c, a second shank 156c and an eyelet member 158c. The eyelet member 158c defines a receiving cavity 159c.

The first shank 154c has a first end 160c and a second end 162c, the second end 162c being formed into a line retaining loop 172c. The second shank 156c has a first end 164c, a second end 166c, and first and second medial portions 168c, 170c disposed therebetween. The second end 166c of the second shank 156c is formed into a line engaging hook 174c.

The first end 160c of the first shank 154c and the first end 164c of the second shank 156c are connected to the eyelet member 158c so that a portion of the first shank 154c and the first medial portion 168c of the second shank 156c extend from the eyelet member 158c in a substantially parallel relationship. The second medial portion 170c of the second shank 156c extends from the first medial portion 168c so that an obtuse angle is formed therebetween, and so that the second medial portion 170c is substantially biased and angularly offset (angle 175c) from a part of the first shank 154c. The angle 175c is any angle sufficient to impart springlike resistance to the first and second shanks 154c and 156c.

The device 152c is attached to a fishing weight 194. The fishing weight 194 is typically constructed of lead, but any suitable material may be used. The fishing weight 194 is formed or cast about a part of the first shank 154c and a part of the first medial portion 168c of the second shank 156c of the device 152c. Except as described above, the connecting device 152c is constructed and used in exactly the same manner as the connecting device 10 shown in FIGS. 1 and 2.

Changes may be made in the construction and the operation of the various components, elements and assemblies described herein and changes may be made in the steps or the sequence of steps of the methods described herein without departing from the spirit and scope of the invention as defined in the following claims.

What is claimed:

1. A device for connecting a line to a fishing accessory without requiring formation of a knot in the line, the device comprising:
   a first shank having a first end and a second end;
   a second shank having a first end and a second end;
   connecting means for connecting the first end of the first shank to the first end of the second shank so that the second shank is disposed at an angular relationship to the first shank whereby the second shank is biased away from the first shank when the second shank is drawn toward a parallel position with the first shank;
   a line engaging hook formed on the second end of the second shank so as to extend in a direction away from the first shank; and
   a line retaining loop formed on the second end of the first shank so as to be disposed a distance from the line engaging hook on the second shank.

2. A device for connecting a first object to a second object with a line without the formation of a knot wherein one end of the line is connected to the second object, the device comprising:
   a first shank having a first end and a second end;
   a second shank having a first end, a second end, a first medial portion and a second medial portion, the first medial portion of the second shank being angularly disposed relative to the second medial portion of the second shank and the first medial portion of the second shank being substantially parallel to the first shank, the second medial portion of the second shank disposed at an angular relationship to the first shank whereby the second medial portion of the second shank is biased away from the first shank when the second medial portion of the second shank is drawn toward a parallel position with the first shank;
   connecting means for connecting the first end of the first shank to the first end of the second shank so as to define a cavity for receiving at least a portion of the first object, the cavity being in open communication, with a passageway formed between the first and second shanks;
   a line engaging hook formed on the second end of the second shank so as to extend in a direction away from the first shank; and
   a line retaining loop formed on the second end of the first shank so as to be disposed a distance from the line engaging hook on the second shank.

3. The device of claim 2 wherein the first shank is further characterized as having a first medial portion and a second medial portion, the first medial portion of the first shank being disposed in an angular relationship to the second medial portion of the first shank so that the first medial portion of the first shank is substantially parallel to the first medial portion of the second shank and the second medial portion is disposed at an angular relationship to the second medial portion of the second shank whereby the second medial portion of the second shank is biased away from the second medial portion of the first shank when the second medial portion of the second shank is drawn toward a parallel position with the second medial portion of the first shank.

4. A method for securing a fishing accessory having a connecting eyelet to a fishing line without requiring formation of a knot in the line, the method comprising the steps of:
   providing a device comprising:
      a first shank having a first end and a second end, the second end of the first shank having a line retaining loop with a passageway into the loop;
      a second shank having a first end and a second end, the second shank disposed at an angular relationship to the first shank whereby the second shank is biased away from the first shank when the second shank is drawn toward a parallel position with the first shank;
      connecting means for connecting the first end of the first shank to the first end of the second shank so as to define a cavity which openly communicates with a passageway formed between the first and second shanks; and
      a line engaging hook formed on the second end of the second shank;
   positioning the connecting eyelet of the fishing accessory over the line engaging hook on the second shank and slidably moving the connecting eyelet through the passageway formed between the first and second shanks until a portion of the connecting eyelet is disposed within the cavity and engaged with the connecting means;
   forming a loop in the line such that a distal end portion of the line is disposed substantially adjacent a portion of the line for a selected distance;
   positioning the loop over the line engaging hook formed on the second shank;
   pulling the line so as to draw the second shank toward the first shank until the first shank and the second shank are substantially parallel whereby the second shank is biased away from the first shank so as to maintain a portion of the line in a tensioned state;

wrapping the line and the adjacently disposed end portion about the first shank a plurality of times; and drawing the line and the remainder of the adjacently disposed end portion of the line through the passageway of the line retaining loop and into the line retaining loop and thereby securing the fishing accessory to the line without requiring a knot to be formed in the line.

5. A method for securing a first object to a second object with a line without requiring formation of a knot in the line wherein one end portion of the line is secured to the second object so that a portion of the line, including a distal end portion thereof, is unattached, the method comprising the steps of:

providing a device connected to the first object, comprising:

a first shank having a first end and a second end, the second end of the first shank having a line retaining loop with a passageway into the loop;

a second shank having a first end and a second end, the second shank disposed at an angular relationship to the first shank whereby the second shank is biased away from the first shank when the second shank is drawn toward a parallel position with the first shank;

connecting means for connecting the first end of the first shank to the first end of the second shank so as to define a cavity which openly communicates with a passageway formed between the first and second shanks such that the connecting means is connectable to the first object with the first and second shanks of the device extending outwardly from the first object; and a line engaging hook formed on the second end of the second shank;

connecting the first object to the connecting means;

forming a loop in the line such that the distal end portion of the line is disposed substantially adjacent a portion of the line for a selected distance;

positioning the loop over the line engaging hook formed on the second shank;

pulling the line so as to draw the second shank toward the first shank until the first shank and the second shank are substantially parallel whereby the second shank is biased away from the first shank to maintain a portion of the line in a tensioned state;

wrapping the line and the adjacently disposed end portion about the first shank a plurality of times; and drawing the line and the remainder of the adjacently disposed end portion of the line through the line retaining loop and thereby securing the second object to the first object via a line without requiring a knot to be formed in the line.

6. A method for securing a fishing accessory to a fishing line without requiring formation of a knot in the line, the method comprising the steps of:

providing a device comprising:

a first shank having a first end connected to the fishing accessory and a second end, the second end of the first shank having a line retaining loop with a passageway into the loop;

a second shank having a first end connected to the fishing accessory and a second end, the second shank disposed at an angular relationship to the first shank whereby the second shank is biased away from the first shank when the second shank is drawn toward a parallel position with the first shank; and a line engaging hook formed on the second end of the second shank;

forming a loop in the line such that a distal end portion of the line is disposed substantially adjacent a portion of the line for a selected distance;

positioning the loop over the line engaging hook formed on the second shank;

pulling the line so as to draw the second shank toward the first shank until the first shank and the second shank are substantially parallel whereby the second shank is biased away from the first shank so as to maintain a portion of the line in a tensioned state;

wrapping the line and the adjacently disposed end portion about the first shank a plurality of times; and drawing the line and the remainder of the adjacently disposed end portion of the line through the line retaining loop and thereby securing the fishing accessory to the line without requiring a knot to be formed in the line.

7. A device for connecting a line to a fishing accessory without requiring formation of a knot in the line, comprising:

a first shank having a first end and a second end;

a second shank having a first end and a second end;

connecting means for connecting the first end of the first shank to the first end of the second shank so that the second shank is disposed at an angular relationship to the first shank whereby the second shank is biased away from the first shank when the second shank is drawn toward a parallel position with the first shank, the connecting means comprising a fishing lure;

a line engaging hook formed on the second end of the second shank; and a line retaining loop formed on the second end of the first shank so as to be disposed a distance from the line engaging hook on the second shank.

8. A device for connecting a line to a fishing accessory without requiring formation of a knot in the line, comprising: p1 a first shank having a first end and a second end;

a second shank having a first end, a second end, a first medial portion and a second medial portion, the first medial portion of the second shank being angularly disposed relative to the second medial portion of the second shank and the first medial portion of the second shank being substantially parallel to the first shank, the second medial portion of the second shank disposed at an angular relationship to the first shank whereby the second medial portion of the second shank is biased away from the first shank when the second medial portion of the second shank is drawn toward a parallel position with the first shank;

connecting means for connecting the first end of the first shank to the first end of the second shank;

a fishing weight connected to at least a portion of the first shank and at least a portion of the first medial portion of the second shank;

a line engaging hook formed on the second end of the second shank; and p1 a line retaining loop formed on the second end of the first shank so as to be disposed a distance from the line engaging hook on the second shank.

9. A device for connecting a line to a fishing accessory without requiring formation of a knot in the line, the device comprising:

a first shank having a first end and a second end;

a second shank having a first end, a second end, a first medial portion and a second medial portion, the first medial portion of the second shank being angularly disposed relative to the second medial portion of the second shank and the first medial portion of the second shank being substantially parallel to the first shank, the second medial portion of the second shank disposed at an angular relationship to the first shank whereby the second medial portion of the second shank is biased away from the first shank when the second medial portion of the second shank is drawn toward a parallel position with the first shank;

connecting means for connecting the first end of the first shank to the first end of the second shank;

a fishing float connected to at least a portion of the first shank and at least a portion of the first medial portion of the second shank;

a line engaging hook formed on the second end of the second shank; and a line retaining loop formed on the second end of the first shank so as to be disposed a distance from the line engaging hook on the second shank.

* * * * *

UNITED STATES PATENT AND TRADEMARK OFFICE
CERTIFICATE OF CORRECTION

PATENT NO. : 5,603,181
DATED : February 18, 1997
INVENTOR(S) : Abdul-Raheem

It is certified that error appears in the above-indentified patent and that said Letters Patent is hereby corrected as shown below:

Cover page, Title, please delete "DEVICE FOR CONNECTED A FISHING LINE TO FISHING ACCESSORIES" and substitute therefor --DEVICE FOR CONNECTING A FISHING LINE TO FISHING ACCESSORIES--.

Column 1, line 1, please delete "DEVICE FOR CONNECTED A FISHING LINE TO FISHING ACCESSORIES" and substitute therefor --DEVICE FOR CONNECTING A FISHING LINE TO FISHING ACCESSORIES--.

Signed and Sealed this

Tenth Day of June, 1997

Attest:

BRUCE LEHMAN

Attesting Officer

Commissioner of Patents and Trademarks